Patented Oct. 17, 1950

2,526,567

UNITED STATES PATENT OFFICE 2,526,567

STABILIZATION OF NUCLEAR CHLOROSTYRENES BY 2,6-DINITROPHENOLS

Stevens S. Drake and John L. Lang, Midland, Mich., assignors to The Dow Chemical Company, Midland, Mich., a corporation of Delaware No Drawing. Application July 6, 1948, Serial No. 37,321

8 Claims. (Cl. 260—650)

This invention relates to a method of stabilizing nuclear chlorostyrenes against polymerization. It also concerns the stabilized compositions.

In view of the tendency of styrene and its derivatives to polymerize at elevated temperatures, it is essential, if polymerization is to be avoided in operations involving the heating or distillation of these materials, to maintain an inhibitor dissolved in the substance throughout the process. In the case of styrene itself, a number of adequate inhibitors are known and the techniques of using them are well understood.

With the nuclear mono- and di-chlorostyrenes, however, the problem of preventing polymerization has remained acute. For one thing, these chlorostyrenes inherently polymerize much more rapidly than does styrene itself. In addition, they are less volatile than the latter, and hence during distillation must be subjected to higher temperatures than are required for styrene. Consequently, many of the inhibitors effective with styrene are far from satisfactory with the chlorostyrenes. Even the few inhibitors, such as p.tert-butyl catechol, which have been used extensively with the chlorostyrenes, lose their effectiveness quite rapidly at elevated temperatures.

It is therefore a principal object of the present invention to provide stabilizers which are far more effective in preventing the polymerization of nuclear chlorostyrenes than even the best inhibitors heretofore used. Another object is to provide inhibitors which will effectively stabilize chlorostyrenes for considerable periods during exposure to temperatures well above 100° C. A related object is to provide stabilizers which act not only by extending the induction period before polymerization of the chlorostyrene begins but also by reducing markedly the rate of that polymerization once it has finally started.

According to the invention, nuclear chlorostyrenes containing not over two chlorine atoms per molecule may be stabilized against polymerization by dissolving therein a small proportion of a 2.6-dinitrophenol corresponding to the general formula

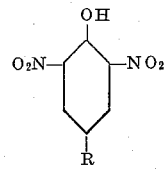

wherein R is a substituent containing not over six carbon atoms and selected from the class consisting of hydrogen, alkyl, and cycloalkyl.

The chlorostyrenes to which the invention is applicable include the individual pure compounds, i. e. the 2-, 3-, and 4-monochlorostyrenes and the 2.3-, 2.4-, 2.5-, 2.6-, 3.4-, and 3.5-dichlorostyrenes. The invention is equally useful in stabilizing mixtures of these chlorostyrenes, particularly those mixtures produced commercially by the pyrolysis of mono-ethylated mono- and di-chlorobenzenes, by the dehydration of nuclearly chlorinated phenyl ethyl alcohols, and by the dehydrochlorination of nuclearly chlorinated chloroethyl benzenes.

Among the 2.6-dinitrophenol inhibitors of the invention, the following have been found most effective: 2.6-dinitrophenol itself, 2.6 dinitro-4-methylphenol, 2.6 dinitro-4-ethyl phenol, 2.6 dinitro - 4 - isopropyl - phenol, 2.6 - dinitro - 4 - tert. butyl phenol, 2.6 dinitro-4-sec. butyl phenol, and 2.6 dinitro-4-cyclohexyl phenol. Of these, 2.6-dinitrophenol itself is perhaps of greatest activity, but its present extremely high price usually dictates the choice of one of the alkyl or cycloalkyl derivatives, several of which are available in quantity as industrial byproducts. Of these latter, the 4 alkyl-2.6 dinitrophenols containing not over four carbon atoms in the alkyl group are preferred.

In stabilizing a monomeric chlorinated styrene according to the invention, the 2.6-dinitrophenol inhibitor selected is simply added to the monomer, either per se or dissolved in a mutual solvent, and stirred in to effect thorough mixing. The proportion of inhibitor added should, of course, be sufficient to effect stabilization, usually at least 0.05 per cent by weight being required. Proportions over 5 per cent are seldom used, with concentrations of 0.5 to 2 per cent being perhaps most generally satisfactory. With any given inhibitor, the higher proportions in the range stated seem to provide the most effective stabilization. In comparing the various 2.6-dinitrophenol inhibitors, it has been found that they are roughly equal when present in the same molecular concentrations. Hence, a somewhat higher proportion by weight is required for the inhibitors of greater molecular weight than for the simpler members of the class.

The 2.6-dinitrophenol inhibitors of the invention are particularly useful in stabilizing nuclearly chlorinated styrenes against polymerization at temperatures above 100° C., even at 130° C. or higher, such as are encountered in distilling the chlorostyrenes at reduced pressure. It is necessary only to maintain the 2.6-dinitrophenol inhibitor dissolved in effective concentration in the liquid undergoing distillation. If desired in a rectification, the inhibitor may also be introduced into the fractionating column and even into the condenser and receiver.

After storage or shipment of the monomeric chlorinated styrene stabilized according to the invention, the latter may be recovered in readily polymerizable form by distillation, by removing the inhibitor with an alkali wash, or in any other convenient way.

2.6-dinitrophenol stabilizers of the invention are particularly advantageous because of their unusual effect on the polymerization process. As is well known, when a chlorinated styrene is heated at a polymerizating temperature, there is first an induction period before polymerization starts at all. The function of most inhibitors is simply to extend the length of this period; once this period is exceeded, the inhibitor has little further effect. With the 2.6 dinitrophenol stabilizers of the class set forth, however, the compound retains an effect even after polymerization finally starts, in that it markedly retards the rate of that polymerization. Hence, if slight polymerization can be tolerated, as is often the case in distillation, the 2.6-dinitrophenol stabilizers will frequently double or triple the time for which the monomer can be heated without serious loss as compared to the best inhibitors heretofore used.

The 2.6-dinitrophenol stabilizers of the present class are further advantageous in that they are themselves more heat-stable than many related inhibitors. Even over prolonged periods at temperatures as high as 130° C. they show little or no tendency to decompose, to form cloudiness in the monomer in which they are dissolved, or to precipitate from the latter.

The following examples will further illustrate the invention but are not to be construed as limiting its scope. In each example, the monomeric materials undergoing test were sealed into modified Foord viscosity tubes and the viscosities measured at 25° C. Each tube was then subjected to the test temperature, being removed from the heating zone periodically, cooled to 25° C., the viscosity measured, and the heating resumed. In this way, the course of each polymerization was followed in terms of the relative viscosity of the sample, i. e., the ratio of the viscosity at each measurement to the initial viscosity.

Example 1

Various inhibitors were tested by the procedure outlined at a temperature of 100° C. and at a concentration of 1.0 per cent by weight. The monomer was commercial 98.7 per cent monochlorostyrene prepared by the pyrolysis of monoethylated monochlorobenzene and being a mixture of approximately 6 per cent of 2-chlorostyrene, 60 per cent of 3-chlorostyrene, and 34 per cent of 4-chlorostyrene. The times required for the samples to reach a relative viscosity of 2.0 are given in the following table.

| Run | Inhibitor | Time to Rel. Visc. 2.0 |
|---|---|---|
| | | Hours |
| 1 | None | 0.05 |
| 2 | Guaiacol | 0.2 |
| 3 | p-tert. butyl catechol | 6 |
| 4 | 2-nitrophenol | 22 |
| 5 | Sulfur | 33 |
| 6 | 2.6-dinitrophenol | (1) |

[1] After 78 hours was only 1.7.

Runs 1 to 5 inclusive are not illustrative of the invention, but are given for comparison with run 6, which is.

Example 2

A number of inhibitors, all in accordance with the invention, were tested by the method described at a concentration of 1.0 per cent by weight and at a temperature of 130° C. The monomer was commercial 99 per cent monochlorostyrene made by the dehydration of nuclearly monochlorinated phenyl methyl carbinol and being an approximately equimolecular mixture of 2-chlorostyrene and 4-chlorostyrene. The relative viscosities at the end of 5, 7, and 9 hours are given in the table:

| Run | Inhibitor | Relative Viscosity | | |
|---|---|---|---|---|
| | | 5 Hrs. | 7 Hrs. | 9 Hrs. |
| 1 | 2.6 dinitrophenol | 1.54 | 2.16 | 3.53 |
| 2 | 2.6 dinitro-4-methyl phenol | 1.87 | 2.87 | 5.70 |
| 3 | 2.6 dinitro-4 ethyl phenol | 1.90 | 3.06 | 6.85 |
| 4 | 2.6 dinitro-4-isopropyl phenol | 2.04 | 3.96 | 10.7 |
| 5 | 2.6 dinitro-4-sec. butyl phenol | 2.08 | 4.38 | (1) |
| 6 | 2.6 dinitro-4-tert. butyl phenol | 2.09 | 3.91 | 9.59 |

[1] Not observed.

Inasmuch as a relative viscosity of 7.0 corresponds to only a small degree of polymerization (about 4 per cent of polymer insoluble in methanol), it is apparent from the foregoing table that all the substances tested are effective both as inhibitors and as retarders of the polymerization of the monochlorostyrene.

Example 3

The substances listed below were tested as inhibitors by the procedure described at a temperature of 130° C. and at a concentration of 1.0 per cent by weight. The monomer was carefully purified 4-chlorostyrene. The relative viscosities at the end of 1, 5, and 9 hours are given in the following table:

| Run | Inhibitor | Relative Viscosity | | |
|---|---|---|---|---|
| | | 1 Hr. | 5 Hrs. | 9 Hrs. |
| 1 | p. tert. butyl catechol | 8.0 | | |
| 2 | 4.6-dinitro-2-chlorophenol | 1.0 | 1.3 | 7.6 |
| 3 | 2.6-dinitrophenol | 1.0 | 1.0 | 1.0 |

With the 2.6-dinitrophenol, the relative viscosity even after 16 hours was only 1.3. Runs 1 and 2 are not in accordance with the invention, but are given for comparison with run 3, which is.

*Example 4*

The test procedure described was carried out at 100° C. on 2.5-dichlorostyrene, an extremely reactive monomer, using 1.0 per cent by weight of 2.6-dinitrophenol as inhibitor. At this temperature, the induction period, as measured by the time required to reach a relative viscosity of 1.2, was 2.5 hours. Even after 6 hours, the relative viscosity was only 5.2.

In a comparative test not in accordance with the invention, in which 1.0 per cent by weight of the standard inhibitor p-tert. butyl catechol was employed, the induction period was about 0.4 hour, and after only 4 hours, a relative viscosity of 18 had been reached.

What is claimed is:

1. A composition comprising a nuclear chlorostyrene containing not over two chlorine atoms per molecule and a 2.6-dinitrophenol corresponding to the general formula

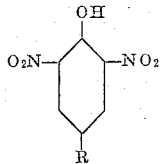

wherein R is a substituent containing not over six carbon atoms and selected from the class consisting of hydrogen, alkyl and cycloalkyl, in a proportion sufficient to inhibit polymerization of the chlorostyrene.

2. A composition according to claim 1 wherein the chlorostyrene is a monochlorostyrene and wherein the dinitrophenol inhibitor is present in a proportion by weight of from 0.05 to 5 per cent.

3. A composition according to claim 2 wherein the dinitrophenol inhibitor is 2.6-dinitrophenol.

4. A composition according to claim 2 wherein the dinitrophenol inhibitor is a 4-alkyl-2.6-dinitrophenol containing not over four carbon atoms in the alkyl group.

5. A composition according to claim 4 wherein the dinitrophenol inhibitor is 2.6-dinitro-4-methyl-phenol.

6. Chlorostyrene stabilized against polymerization by from 0.5 to 2 per cent by weight of 2.6-dinitrophenol dissolved therein.

7. A method of stabilizing a nuclear chlorostyrene containing not more than two chlorine atoms per molecule against polymerization which comprises dissolving therein at least 0.05 per cent by weight thereof of a 2.6-dinitrophenol corresponding to the general formula

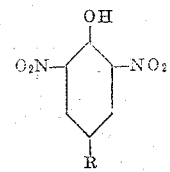

wherein R is a substituent containing not over six carbon atoms and selected from the class consisting of hydrogen, alkyl, and cycloalkyl.

8. In a process wherein a nuclear chlorostyrene containing not more than two chlorine atoms per molecule is subjected to distillation at a temperature of at least 100° C., the method of preventing polymerization of the chlorostyrene which comprises maintaining dissolved therein from 0.05 to 5 per cent by weight thereof of a 2.6-dinitrophenol corresponding to the general formula

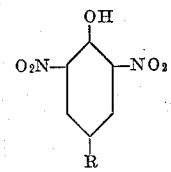

wherein R is a substituent containing not over six carbon atoms and selected from the class consisting of hydrogen, alkyl, and cycloalkyl.

STEVENS S. DRAKE.
JOHN L. LANG.

REFERENCES CITED

The following references are of record in the file of this patent:

UNITED STATES PATENTS

| Number | Name | Date |
|---|---|---|
| 2,181,102 | Stoesser et al. | Nov. 21, 1939 |
| 2,295,077 | Dreisbach et al. | Sept. 8, 1942 |
| 2,304,728 | Boyer et al. | Dec. 8, 1942 |